(12) United States Patent
Kanou (10) Patent No.: US 7,463,560 B2
(45) Date of Patent: Dec. 9, 2008

(54) OPTICAL DISC DEVICE

(75) Inventor: Yasuyuki Kanou, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 507 days.

(21) Appl. No.: 10/951,733

(22) Filed: Sep. 29, 2004

(65) Prior Publication Data

US 2005/0068860 A1 Mar. 31, 2005

(30) Foreign Application Priority Data

Sep. 29, 2003 (JP) ............................. 2003-336787

(51) Int. Cl.
*G11B 7/00* (2006.01)

(52) U.S. Cl. .............. 369/44.25; 369/44.28; 369/44.34; 369/44.35; 369/44.41

(58) Field of Classification Search ................ 369/53.2, 369/44.27, 53.23, 44.23, 94
See application file for complete search history.

(56) References Cited

U.S. PATENT DOCUMENTS 5,963,524 A * 10/1999 Tokiwa et al. ............. 369/53.23
6,633,522 B2 * 10/2003 Ryu .......................... 369/44.29
2003/0063530 A1 * 4/2003 Takehara et al. ......... 369/44.23
2005/0122879 A1 * 6/2005 Hirai et al. ..................... 369/94

FOREIGN PATENT DOCUMENTS

JP 2002-367197 12/2002

* cited by examiner

*Primary Examiner*—Muhammad N. Edun
(74) *Attorney, Agent, or Firm*—Edwards Angell Palmer & Dodge LLP

(57) ABSTRACT

In an optical disc device of the present invention, time differences among the focus error signal corresponding to the surface of the optical disc, the focus error signal corresponding to the first reflection layer, and the focus error signal corresponding to the second reflection layer, all of which are obtained through the light receiving element when a relative distance between the objective lens and the optical disc is linearly changed in a focus search of the optical disc are measured. The thickness of the cover layer from the surface of the optical disc to the first reflection layer and the thickness of a cover layer from the surface of the optical disc to the second reflection layer are detected on the basis of these time differences.

6 Claims, 10 Drawing Sheets

FIG. 1A first position

FIG. 1B first position movement distance of objective lens second position

FIG. 1C second position movement distance of objective lens third position

PIOR ART

FIG. 10A  FIG. 10B  FIG. 10C

OPTICAL DISC DEVICE

The priority application No. 336787/2003 upon which this patent application is based is hereby incorporated by reference.

BACKGROUND OF THE INVENTION

1. Field of the Invention

The present invention relates to an optical disc beneficial for reproducing, or recording and reproducing high-density, large-capacity optical discs.

2. Description of the Related Art

Currently prevailing optical discs include optical discs of the CD format such as CDs, CD-ROMs, CD-Rs and CD-RWs, and the DVD format such as DVDs, DVD-ROMs, DVD-Rs, DVD-RWs, DVD-RAMs, DVD+Rs, and DVD+RWs capable of recording and reproducing data with higher density and larger capacity by the use of red lasers. Particularly in recent years, the Blu-ray disc standard (the term "Blu-ray disc" is a trademark of SONY KABUSHIKI KAISHA CORPORATION JAPAN 7-35, Kitashinagawa 6-chome Shinagawa-ku, Tokyo JAPAN), the Advanced Optical Disc (AOD) standard and the like capable of recording and reproducing data with even higher density and larger capacity by the use of blue lasers have been introduced. Optical discs and disc drives according to such standards are being commercially developed.

Figure 9:
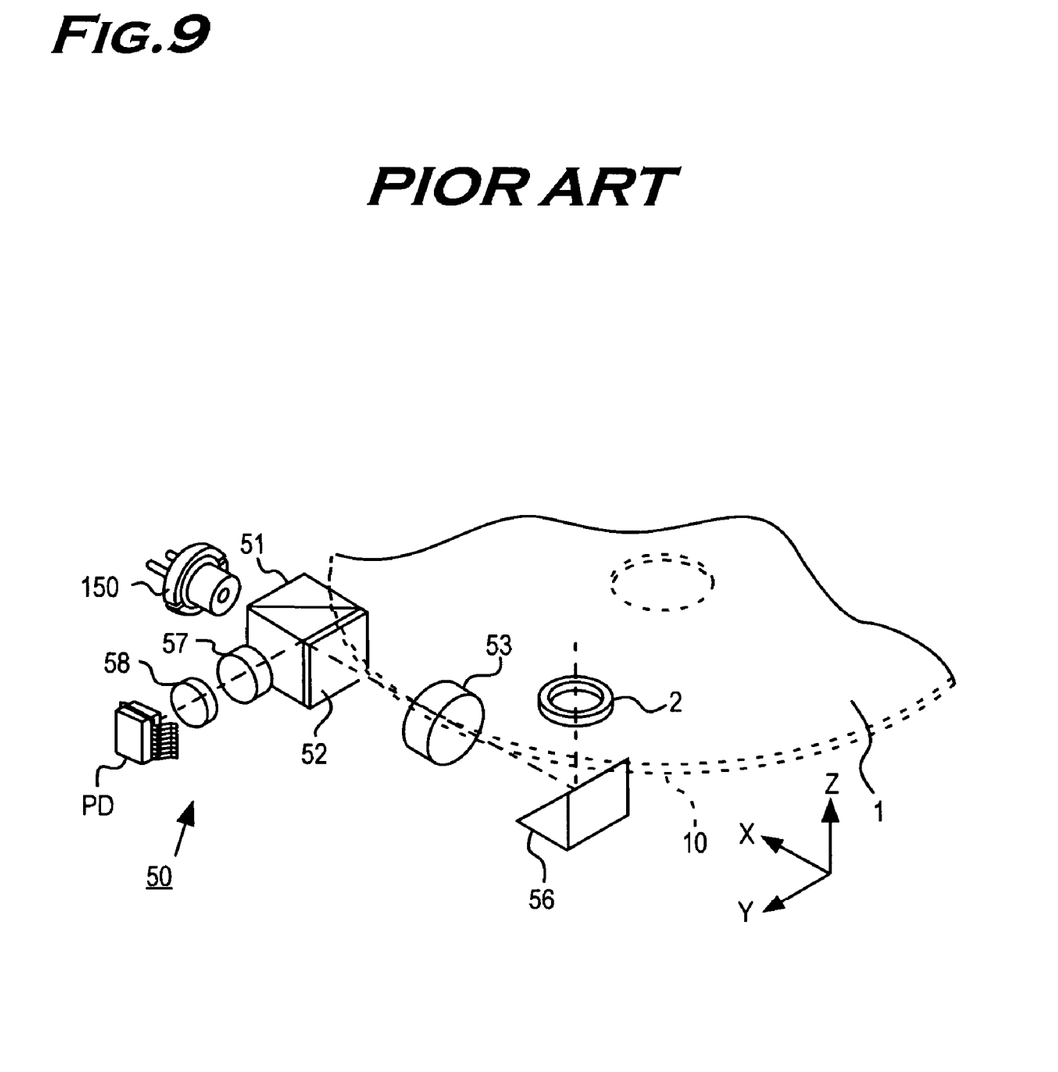
FIG. 9 is a schematic perspective view illustrating a structure of a pickup used in a conventional optical disc device.

As an example of a mechanism for reading out data (pickup) in such an optical disc device, a mechanism conventionally adopted for an optical disc device of the Blu-ray disc standard will be schematically described as referring to FIG. 9.

As shown in FIG. 9, an optical disc device of this kind usually comprises a pickup 50 which is a mechanism for reading a disc. The pickup 50 basically comprises a semiconductor laser oscillator (LD) 150 which oscillates the laser light, a 45-degree reflection mirror 56 which reflects the laser light, an objective lens 2 which converges the laser light to focus on a reflection layer (recording layer) 10 of the optical disc, and a polarizing beam splitter 51 which leads the reflection light from the optical disc and the 45-degree reflection mirror 56 to a light receiving element (PD) 160. A lens actuator (not shown) capable of moving the objective lens 2 slightly upward and downward is provided for focusing as an auxiliary unit. The objective lens 2 must have high quality to converge a beam to the diffraction limit, and its numerical aperture (NA) is set as high as about 0.85 for example.

In this example, the semiconductor laser oscillator 150 used as a light source is typically a blue-violet laser diode which oscillates laser light with a wavelength of 405 nm. A collimator lens 53 for shaping incident laser light is provided so that collimated light is incident to the objective lens. A condenser lens 57 and a cylindrical lens 58 are provided for condensing reflection light of laser light reflected from the reflection layer 10 of the loaded optical disc.

More specifically, predetermined polarized components out of linear polarized laser light generated from the semiconductor laser oscillator 150 are transmitted toward the disc through the polarizing beam splitter 51 in order to be circularly polarized by a quarter wavelength plate 52. Laser light collimated by the collimator lens 53 is reflected from the 45-degree reflection mirror 56 and irradiated to the reflection layer 10 after being converged by the objective lens 2. The laser light reflected from the reflection layer 10 reaches the quarter wavelength plate 52 through the 45-degree reflection mirror 56 and the collimator lens 53, to become linearly polarized light which has a phase difference of 90 degrees from the original polarizing direction. The polarizing beam splitter 51 only reflects polarized components different from the polarized components reflected as described above so that reflected light is condensed by the condenser lens 57 and the cylindrical lens 58 to be incident to the light receiving element 160. The light receiving element 160 converts incident laser light into an electrical signal. The converted electrical signal is amplified and transmitted outside the pickup 50 to be demodulated in a well-known manner.

When focusing by a pickup, the distance between the disc surface and the objective lens is adjusted by driving the lens actuator to move the objective lens upward and downward.

When recording and reproducing data on such a high-density optical disc, a focal spot diameter of laser light oscillated from the semiconductor laser oscillator (laser light source) must be small on the disc. The spot diameter is basically calculated from the following formula.

Spot diameter=wavelength of laser light source $\lambda$/numerical aperture of objective lens NA (1)

As can be seen from this formula (1), the focal spot diameter of laser light is proportional to the wavelength of the laser light source $\lambda$, and is inversely proportional to the numerical aperture of the objective lens NA. Therefore, the focal spot diameter of laser light may be reduced by shortening the wavelength of the laser light source $\lambda$ or by using the objective lens with higher numerical aperture. For example, the wavelength $\lambda$ of the laser light source is 405 nm while the numerical aperture of the objective lens is 0.85 for the optical disc of the Blu-ray disc standard.

If the numerical aperture of the objective lens is this high, however, tolerance for disc tilt becomes stringent. Tolerance for disc tilt is calculated from the following formula.

Tolerance for disc tilt=wavelength of laser light source $\lambda$/(numerical aperture of objective lens NA)$^3$ (2)

As can be seen from this formula (2), tolerance for disc tilt is proportional to the wavelength of the laser light source, and is reduced in inverse proportion to the $3^{rd}$ power of the numerical aperture of the objective lens. Therefore, the thickness of the disc cover layer must be particularly small in order to maintain tolerance for disc tilt for the optical disc of the Blu-ray disc standard which utilizes the objective lens with a high numerical aperture.

The optical disc of the Blu-ray disc standard has a tolerance for disc tilt which is one-fifth of that of the DVD standard (wavelength of laser light source $\lambda$: 650 nm, numerical aperture of objective lens NA: 0.6) Therefore, the optical disc of the Blu-ray disc standard must have a cover layer of approximately 100 µm in thickness as compared to a cover layer of 600 µm in thickness of the optical disc of the DVD standard.

Additionally, two reflection layers (recording layers) are supposed to be provided on one side of the high-density optical disc in order to increase data recording capacity. The first reflection layer (recording layer) and the second reflection layer (recording layer) must be distanced from each other as far as possible (for example, about 25 µm apart) so that reflection light from one layer does not affect reflection light from the other layer. Consequently, the thickness of the cover layer from the disc surface to the first reflection layer and the thickness of the cover layer from the disc surface to the second reflection layer are different. In the optical disc of the Blu-ray disc standard where the thickness of the cover layer is particularly thin, the ratio of each thickness deviation of the cover layer for the first reflection layer and the second reflection layer to the thickness 100 μm of the cover layer of the disc increases since the thickness of the cover layer of the optical disc is inherently thin.

On the other hand, although the objective lens is designed in consideration of the thickness of the cover layer of the disc, spherical aberration is generated on reflection layers of the optical disc if the thickness of the cover layer of the disc is out of the standard thickness of 100 μm.

Next, the relation between spherical aberration and the thickness of the cover layer of the disc will be described as referring to FIG. 10. FIGS. 10A, 10B and 10C enlarge and illustrate the relation between the cover layer of the disc and the focal position respectively when the cover layer of the disc is thinner than the standard (FIG. 10A), according to the standard (FIG. 10B) and thicker than the standard (FIG. 10C).

Figure 10A:
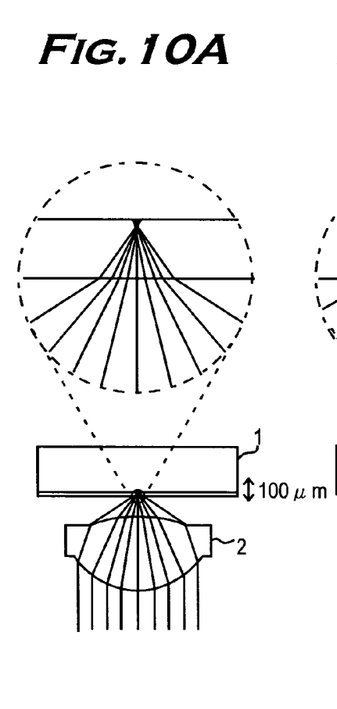
FIGS. 10A, 10B and 10C are schematic side views of the optical disc and the objective lens illustrating whether spherical aberration accompanies the focus search or not, and examples where spherical aberration occurs.
Figures 10B, 10C:
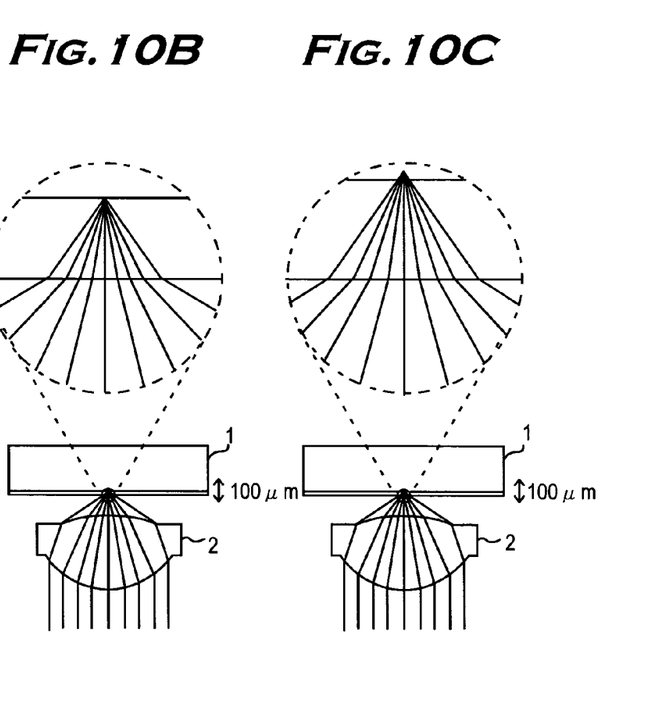

As shown in FIG. 10A, the focal position is recognized at a position a little more distant from the disc in a focus search when the thickness of the disc cover is thinner than the standard as compared to the case when the thickness of the cover layer is according to the standard. Therefore, a focus error 9FE) signal of laser light reflected from the optical disc is recognized short of the reflection layer. The focal spot diameter of laser light becomes large on the surface of the reflection layer of the disc since rays of laser light intersect before the reflection layer of the disc, which causes spherical aberration. As shown in FIG. 10B, a focus error signal is recognized on the reflection layer of the disc in the focus search when the thickness of the disc cover is according to the standard, so that the focal position may fall on the reflection layer of the disc. On the other hand, when the thickness of the disc cover is thicker than the standard, the focal position of the objective lens is recognized at a position a little nearer to the disc in the focus search as compared to the case when the thickness of the cover layer is according to the standard, as shown in FIG. 10C. Therefore, laser light reflected from the optical disc is focused at a deeper position inside the disc away from the objective lens. The focal spot diameter of the laser light thus becomes large on the surface of the reflection layer of the disc since the focus error signal is recognized at the deeper position beyond the reflection layer, which causes spherical aberration.

Spherical aberration is basically calculated from the following formula.

$$\text{Spherical aberration} = (\text{thickness deviation of cover layer } \Delta d/\text{standard thickness of cover layer } d) \times (\text{numerical aperture of objective lens NA})^4 \quad (3)$$

As can be seen from this formula (3), spherical aberration is proportional to the $4^{th}$ power of the numerical aperture of the objective lens NA.

Such spherical aberration hinders the appropriate focal spot diameter from falling on the reflection layer of the optical disc, degrading recording or reproducing function of the optical disc device.

In this connection, an optical disc device to detect spherical aberration by the use of a hologram element is conventionally disclosed in the Japanese Published Application 367197/2002, A, for example. In this optical disc device, a hologram element is used to separate light into a light flux passing through the outer circumference, which is away from the optical axis, of the objective lens and a light flux passing through the center, which is close to the optical axis, of the objective lens. Spherical aberration is detected by obtaining the difference in intensity of the two light fluxes.

In this way, spherical aberration may be corrected by providing means for detecting spherical aberration in an optical disc device to control an actuator for correcting spherical aberration with a feedback of the detected spherical aberration signal.

Providing means for detecting spherical aberration as described above for an optical disc deice, however, not only complicates the detection mechanism but also increases the number of parts. Furthermore, the number of manufacturing processes and manufacturing cost inevitably increase because of the necessity of adjustment work and so on.

The present invention was made in consideration of such conditions and its objective is to provide an optical disc device which may detect factors causing spherical aberration more easily and precisely without using complicated means for detecting spherical aberration.

SUMMARY OF THE INVENTION

In order to achieve the objective, an optical disc device according to the present invention comprises: an objective lens for condensing laser light emitted from a laser light source onto a reflection layer on which data is recorded of an optical disc through a light-transmitting cover layer covering the reflection layer; and a light receiving element for receiving reflection light from the reflection layer of the optical disc and converting the reflection light to an electrical signal in order to perform at least either data storage to the reflection layer or data reproduction from the same layer, wherein detection means is provided to detect a thickness of the cover layer on the basis of time difference between a focus error signal corresponding to a surface of the optical disc and a focus error signal corresponding to the reflection layer, both of which are obtained through the light receiving element when a relative distance between the objective lens and the optical disc is linearly changed in a focus search of the optical disc.

When the optical disc device structured like this, whether there is any influence of spherical aberration or not may be determined correctly, though indirectly, from the thickness of the cover layer detected on the basis of the above-described focus error signal. In other words, whether spherical aberration is generated or not, its level and so on may be determined without providing any special means to detect spherical aberration. As was already described, the thickness deviation of the cover layer causes spherical aberration. By correctly determining the thickness of the cover layer, it is possible to operate the optical disc device appropriately.

Further, the present invention is characterized by that in the above-described optical disc device, the optical disc has a dual layer structure with a first reflection layer and a second reflection layer laminated at a predetermined interval on one side, and detection means detects respectively a thickness of the cover layer from the surface of the optical disc to the first reflection layer and a thickness of the cover layer from the surface of the optical disc to the second reflection layer on the basis of time differences among the focus error signal corresponding to the surface of the optical disc, a focus error signal corresponding to the first reflection layer, and a focus error signal corresponding to the second reflection layer, all of which are obtained through the light receiving element when the relative distance between the objective lens and the optical disc is linearly changed in the focus search of the optical disc.

For example, the above-described optical disc of the Blu-ray disc standard has dual layer structure with a first reflection layer and a second reflection layer laminated at a predetermined interval on one side. At present, it is this optical disc of the Blu-ray disc standard that needs an objective lens with a high numerical aperture for its optical system (pickup). Therefore, the thickness deviation of the cover layer can not be ignored at a cause to generate spherical aberration. According to the above-described structure, the thickness of the cover layer from the optical disc surface to the first reflection layer and the thickness of the cover layer from the optical disc surface to the second reflection layer may be accurately detected. Consequently, it is possible to appropriately operate the optical disc device which reads out data from and writes data to the above-described optical disc of the Blu-ray disc standard for example.

Additionally, the present invention is characterized by that in each of the above-described optical disc devices, detection means comprises means for judging a movement speed of the objective lens on the basis of a drive voltage of an actuator which linearly changes the relative distance between the objective lens and the optical disc, and the thickness of the cover layer is detected by multiplying the time differences by the judged movement speed of the objective lens.

Usually, drive voltage for the above-described actuator is fairly stable. The movement speed of the objective lens when relative distance between the optical disc and the objective lens is linearly changed is almost directly proportional to this voltage. Therefore, the movement speed of the objective lens is detected by tabulating the relation between the drive voltage for the actuator and the movement speed of the objective lens, so that the thickness of the cover layer can be quite accurately detected.

The present invention is further characterized by any one of the above-described optical disc devices further comprising correction means to correct the way the objective lens condenses light in accordance with the thickness of the cover layer detected by the detection means.

With the optical disc device structured like this, the optical disc device itself may automatically correct spherical aberration caused by the thickness deviation of the cover layer. Such an additional function is particularly beneficial for the optical disc device which reads out data from and writes data to the optical disc of the Blu-ray disc standard.

Additionally, the present invention is characterized by that in the above-described optical disc device, correction means is a beam expander which may change a diameter of laser light incident to the objective lens by combining at least two lenses.

The above-described beam expander is generally adopted in an optical system (pickup) of such an optical disc device. Therefore, spherical aberration can be automatically corrected without increasing the number of parts according to the above-described structure using such a beam expander as correction means.

According to the present invention, whether there is any influence of spherical aberration or not may be determined correctly, though indirectly, from the thickness of the cover layer detected on the basis of the focus error signal. In other words, whether spherical aberration is generated or not, its level and so on may be determined without providing any special means to detect spherical aberration. By correctly determining the thickness of the cover layer, it is possible to operate the optical disc device appropriately.

BRIEF DESCRIPTION OF THE DRAWINGS

FIGS. 2(a) and (b) are time charts respectively illustrating a movement track of the objective lens, and generation mode of an FE signal both accompanying the above-described focus search;

FIGS. 8(a) and (b) are time charts respectively illustrating the movement track of the objective lens, and generation mode of the FE signal both accompanying the focus search;

The foregoing and other objects, features, aspects and advantages of the present invention will become more apparent from the following detailed description of the present invention when reviewed in conjunction with the accompanying drawings.

DESCRIPTION OF AN EXEMPLARY EMBODIMENT

One embodiment of an optical disc device according to the present invention will be described in detail as referring to drawings. In this embodiment, description is made for a device to reproduce data written in an optical disc of the Blu-ray disc standard which has dual layer structure with a first reflection layer and a second reflection layer for example.

First, a detection principle of detection means to detect the thickness of the cover layer of the optical disc according to this embodiment will be described, as referring to FIGS. 1A, 1B and 1C, and FIG. 2.

Figure 1A:
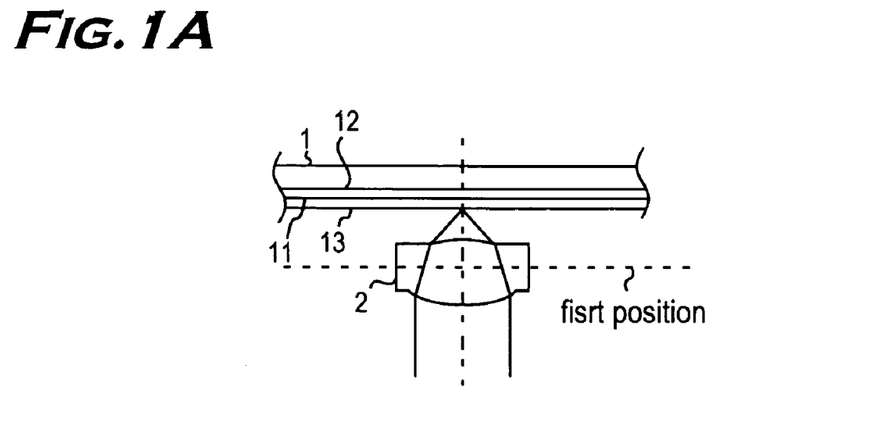
FIGS. 1A, 1B and 1C are schematic side views of an optical disc and an objective lens respectively illustrating a focal position on the disc surface, a focal position on a first reflection layer, and a focal position on a second reflection layer in a focus search of the objective lens.
Figure 1B:
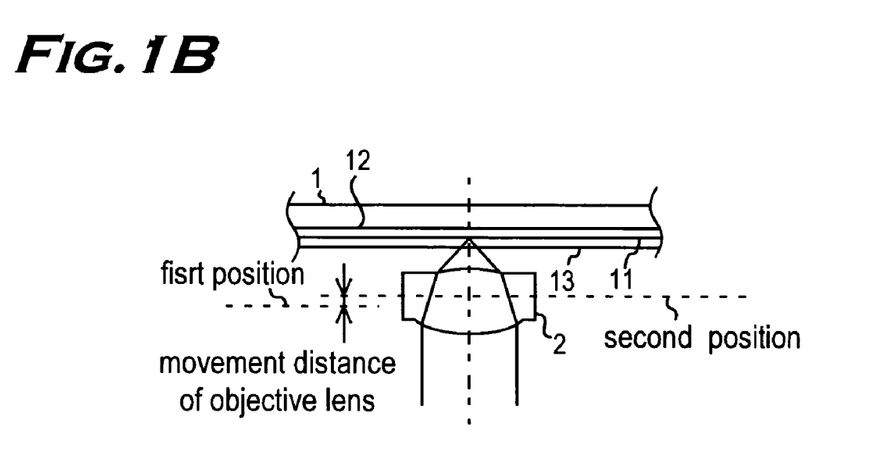
Figure 1C:
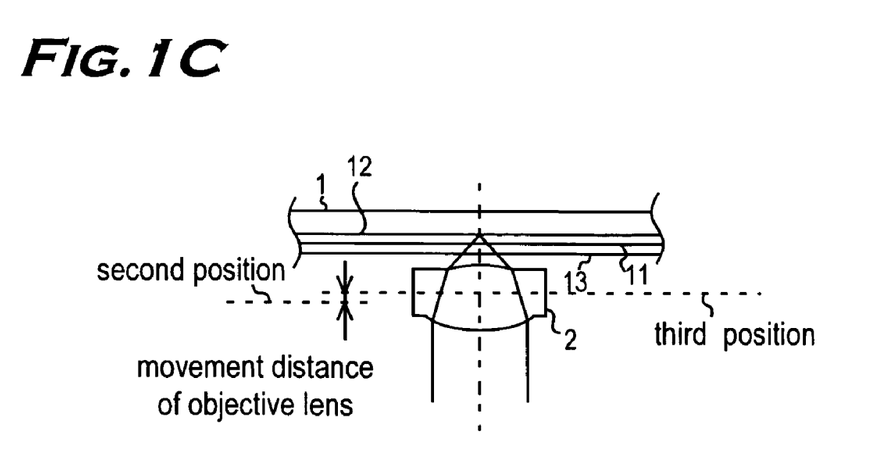
Figure 2:
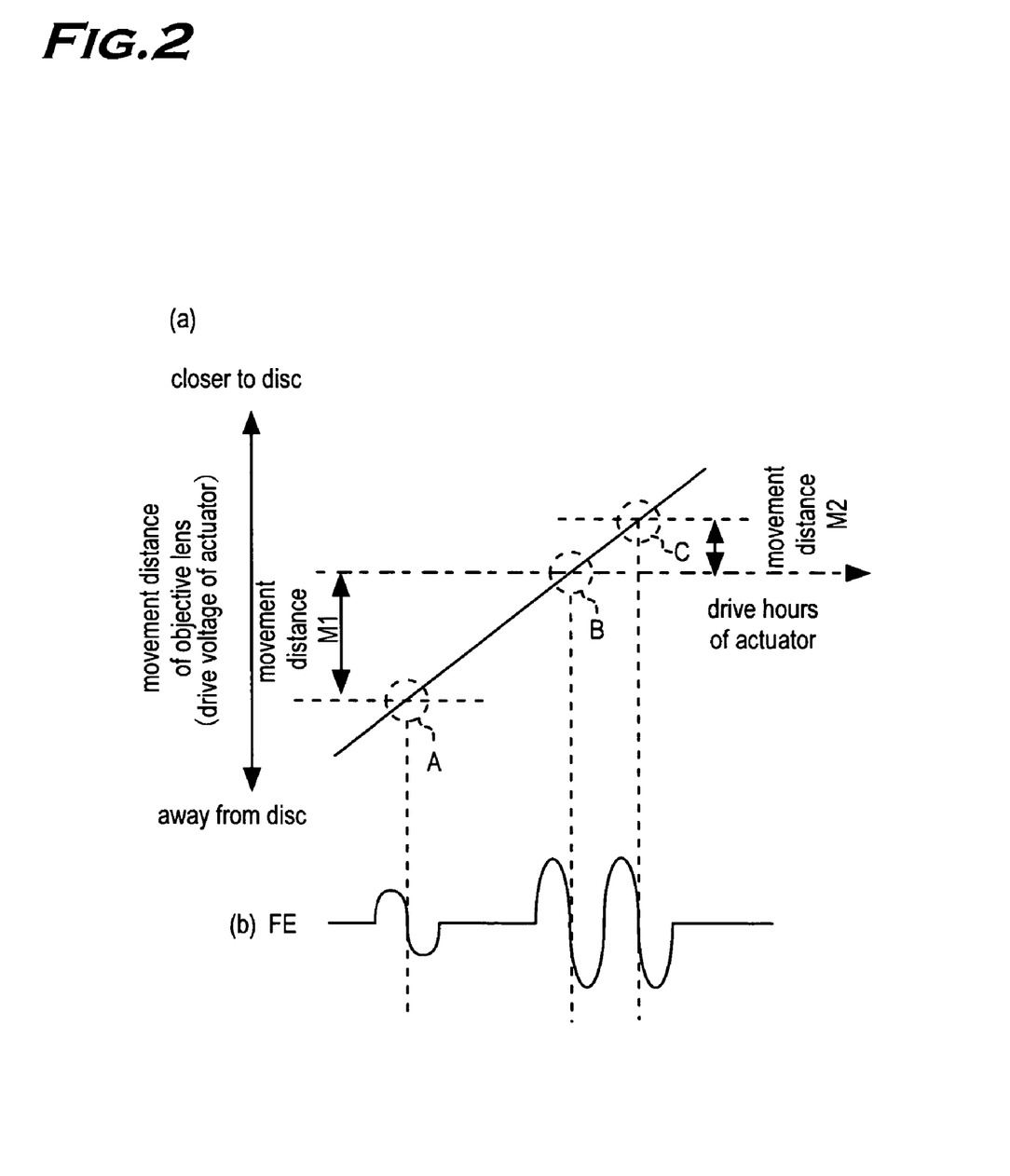

The concept of the optical disc 1 of the Blu-ray disc standard which has a dual layer structure with the first reflection layer 11 and the second reflection layer 12 is schematically illustrated in FIGS. 1A, 1B and 1C. According to the Blu-ray disc standard, the thickness of the cover layer between the optical disc surface 13 and the first reflection layer 11 is 100 µm while the thickness of the cover layer between the first reflection layer 11 and the second reflection layer 12 is 25 µm.

FIG. 1A schematically illustrates the status where the focal position falls on the optical disc surface 13 as the objective lens 2 is being brought toward the optical disc 1 by driving the actuator of the objective lens 2 during the focus search (focusing). Likewise, FIGS. 1B and 1C schematically illustrate statuses where the focal position falls on the first reflection layer 11 and the second reflection layer 12 respectively as the objective lens 2 is being brought toward the optical disc 1 by driving the actuator of the objective lens 2 during the focus search. The center position of the objective lens 2 when the focal position falls on the optical disc surface 13, the first reflection layer 11, and the second reflection layer 12, respectively, is schematically illustrated by dotted lines as the first position, the second position and the third position in these Figs.

FIG. 2(a) illustrates the track of the objective lens 2 as the objective lens 2 (FIGS. 1A, 1B and 1C) is being linearly brought from a position distant from the optical disc 1 (FIGS. 1A, 1B and 1C) to a position nearer to the disc during the focus search. As can be seen from this track, the movement distance of the objective lens 2 may be determined from the drive voltage applied to the lens actuator and driving time of the actuator. The movement distance of the objective lens 2 may be determined by the movement speed of the actuator× driving time of the actuator. Besides, the movement speed of the actuator is proportional to the drive voltage of the actuator. Therefore, the relation between the drive voltage of the actuator and the movement speed of the actuator is tabulated on a conversion table in advance, so that the movement speed of the objective lens may be found from the table.

When the lens actuator is driven to move the objective lens 2 (FIGS. 1A, 1B and 1C) toward the optical disc 1 (FIGS. 1A, 1B and 1C), the laser light reflected at the vicinity of the focal point is detected, and an S-curved error signal is generated as the focus error (FE) signal. FIG. 2(b) illustrates generation mode of the focus error (FE) signal in accordance with the track of the objective lens 2 as shown in FIG. 2(a). Each focal position (position of focal point) of the lens appears in accordance with the timing when the FE signal is on the zero-crossing. For example, the first S-curved FE signal as shown in FIG. 2(b) appears at the point A in the track of FIG. 2(a) corresponding to the optical disc surface 13 in FIG. 1A. The second S-curved FE signal as shown in FIG. 2(b) appears at the point B in the track of FIG. 2(a) corresponding to the first reflection layer 11 in FIG. 1B. This FE signal appears with a larger amplitude of vibration than that of the FE signal at the point A, since this FE signal appears corresponding to the reflection layer (recording layer). Additionally, the third FE signal as shown in FIG. 2(b) appears at the point C in the track of FIG. 2(a) corresponding to the second reflection layer 12 in FIG. 1C. This FE signal appears with amplitude of vibration comparable to that of the FE signal at the point B, since this FE signal also appears corresponding to the reflection layer (recording layer). The present movement distance of the objective lens 2, namely, the thickness of the cover layer of the optical disc 1 is calculated based on generation intervals (time) of the FE signal and drive voltage (movement speed of the objective lens 2) of the actuator, as disclosed below.

(i) The movement distance of the objective lens from the point A on the disc surface to the point B on the first reflection layer [M1]=(driving time of the actuator from the point A to the point B)×(the movement speed of the objective lens)=the thickness of the cover layer from the point A on the disc surface to the point B on the first reflection layer.

(ii) The movement distance of the objective lens from the point B on the first reflection layer to the point C on the second reflection layer [M2]=(driving time of the actuator from the point B to the point C)×(the movement speed of the objective lens)=the thickness of the cover layer from the point B on the first reflection layer to the point C on the second reflection layer.

(iii) The thickness of the cover layer from the point A on the disc surface to the point C on the second reflection layer=M1+M2.

Figure 3:
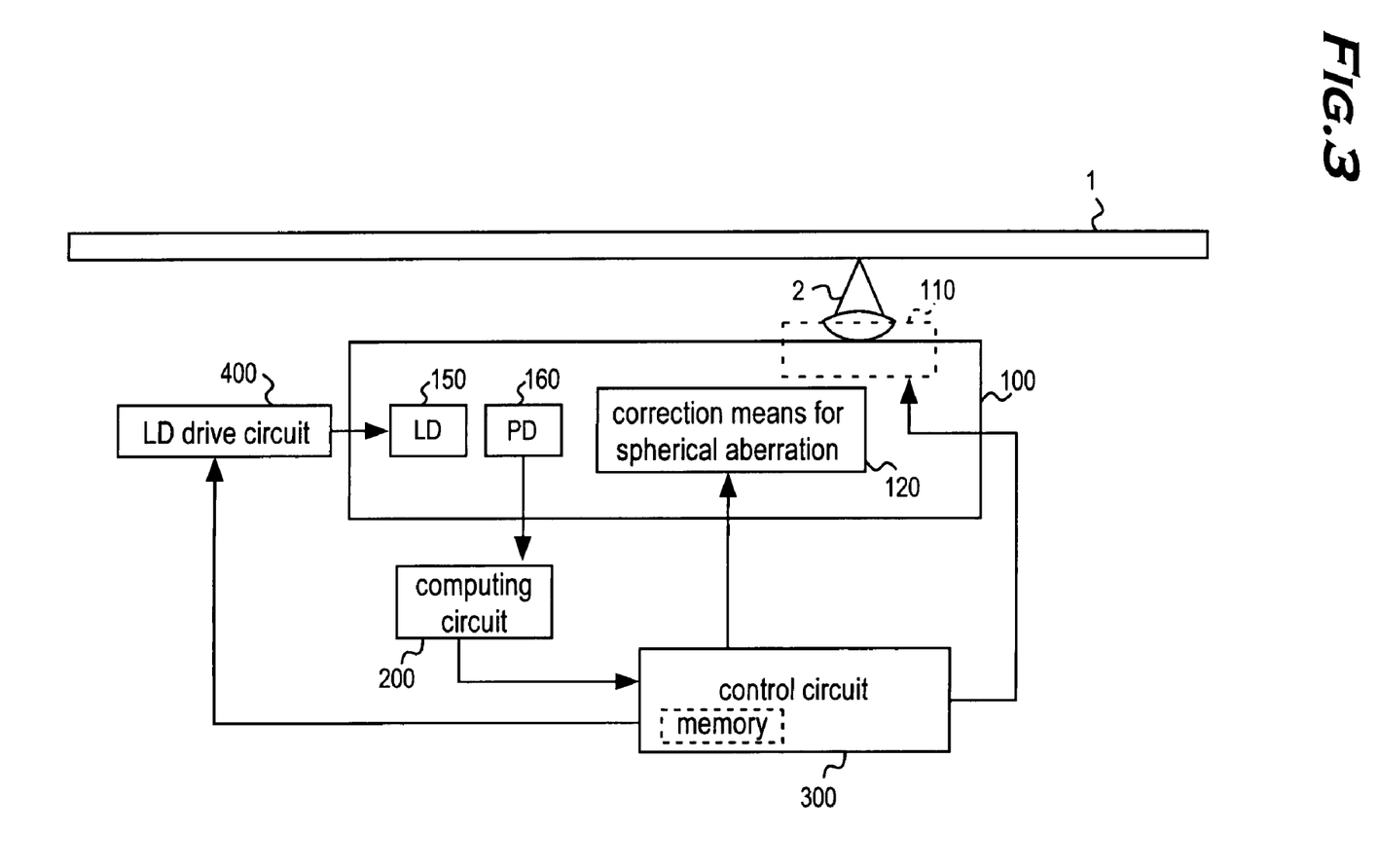
FIG. 3 is a block diagram illustrating one embodiment of an optical disc device according to the present invention.
Figure 4:
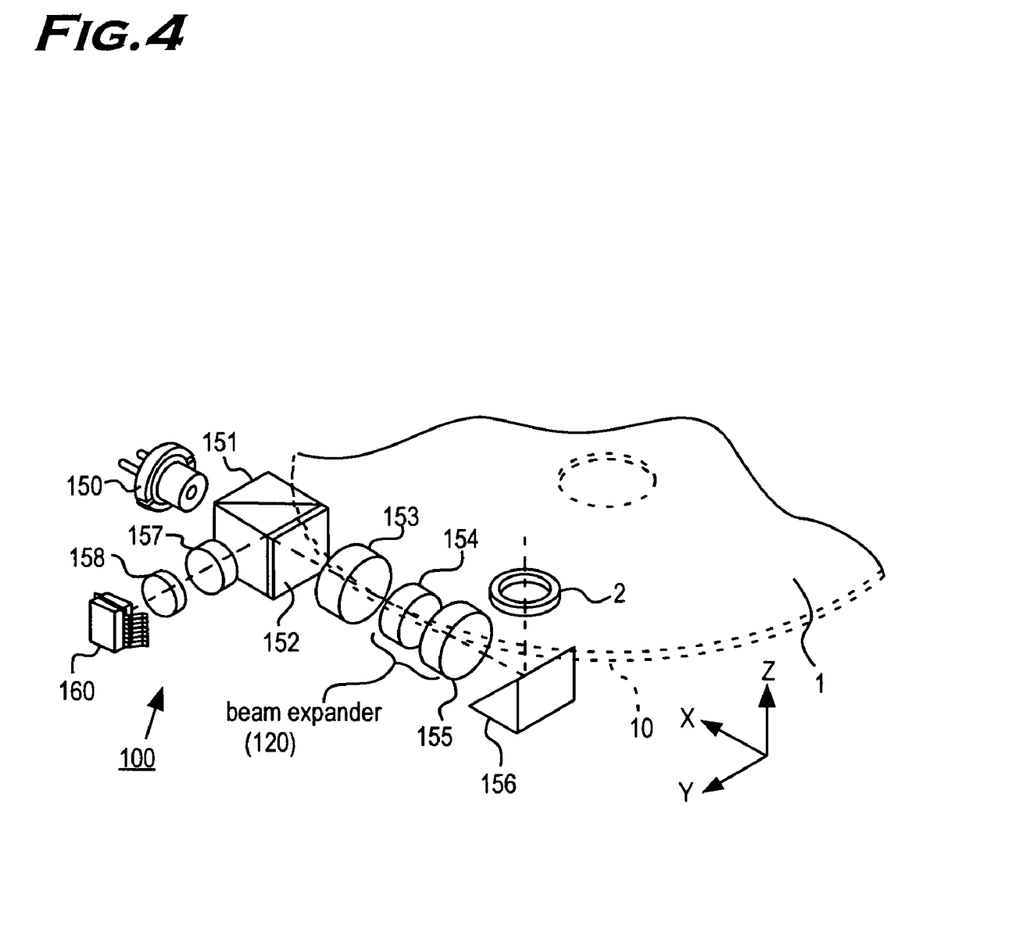
FIG. 4 is a schematic perspective view illustrating the structure of a pickup used in the optical disc device of the embodiment.
Figure 5A:
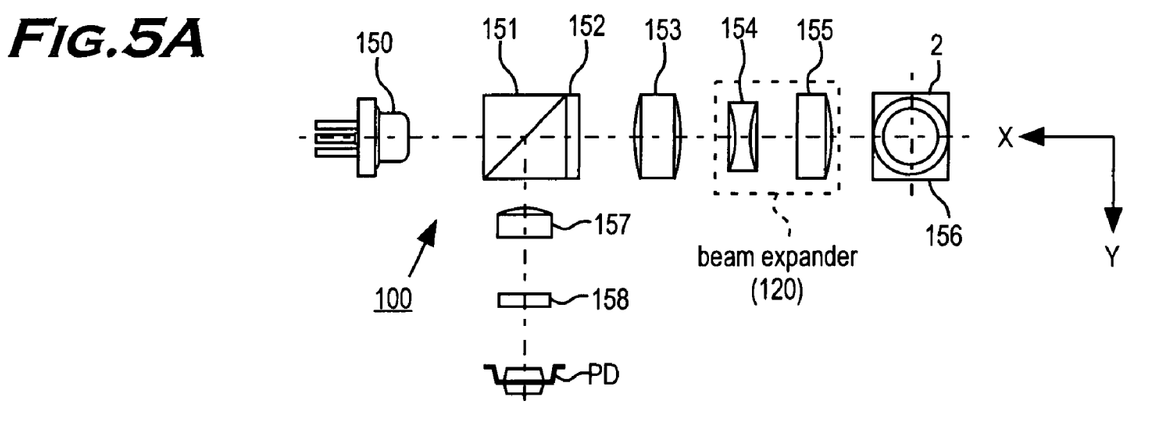
FIGS. 5A and 5B are respectively an XY-plane view and an XZ-plane view of the pickup.
Figure 5B:
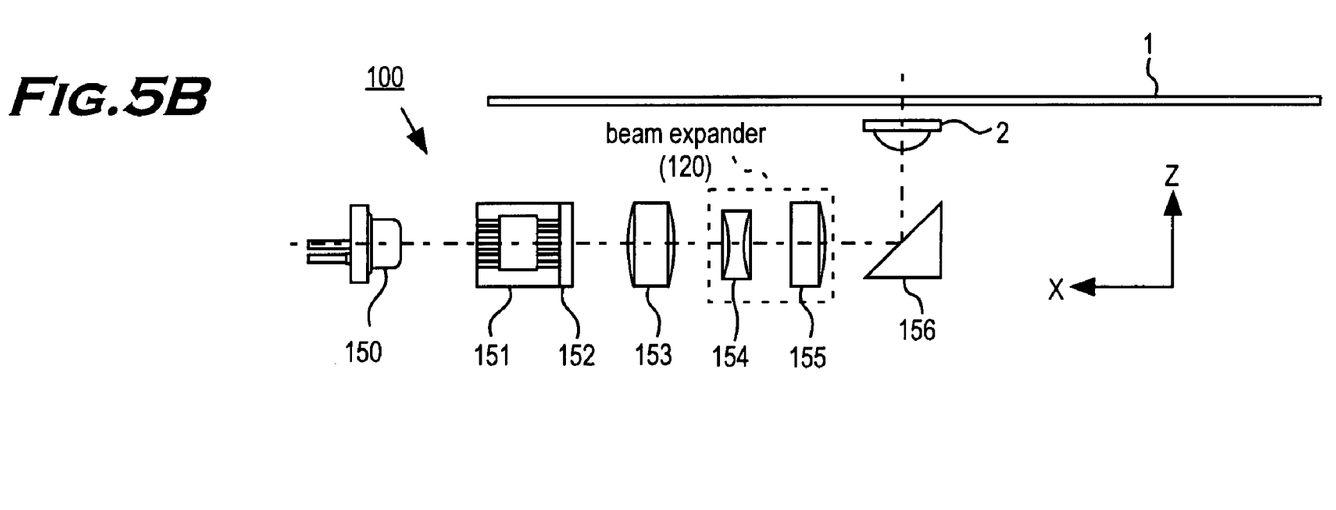

Next, brief explanation is made for the optical disc device according to this embodiment structured on the basis of these principles, as referring to FIGS. 3, 4 and 5.

In the optical disc device as shown in FIG. 3, a pickup (optical pickup) 100 reads out data stored in an optical disc 1 by laser light in order to covert into an electrical signal. Inside the pickup 100 are provided a semiconductor laser oscillator 150 as a light source, an optical system comprising a plurality of lenses such as an objective lens 2, a mirror, a beam splitter and the like, an actuator 110 for driving the objective lens, correction means for spherical aberration 120 which is a beam expander for example, and a light receiving element 160. The pickup 100 irradiates laser light to the reflection layer of the optical disc 1 as well as receives laser light reflected from the reflection layer by the light receiving element 160 in order to convert into the electrical signal. The converted electrical signal is properly amplified and transmitted to a computing circuit 200 as the FE signal.

The computing circuit 200 computes the electrical signal transmitted from the pickup 100 during the focus search by a well-known computing method in order to generate the FE signal. The FE signal generated in this manner is outputted to a control circuit 300 as shown in FIG. 3.

The control circuit 300 shown in FIG. 3 generally controls each function of the optical disc device on the basis of each control program stored in a built-in memory or the like, as well as commands transmitted from an external processor unit (such as a personal computer, player, recorder), which is not shown through an interface. An LD (semiconductor laser oscillator) drive circuit 400, which will be described later, also carries out necessary processes based on commands from the control circuit 300. Specifically, the control circuit 300 drives the semiconductor laser oscillator 150 of the pickup 100 by outputting an LD drive signal to an LD drive circuit. The above-described focus search in the pickup 100 is made possible by an actuator drive signal outputted from the control circuit 300 to the actuator 110 of the objective lens.

Additionally, the focus position (focal point) is recognized by the control circuit 300 from the FE signal computed in the above-described manner. The thickness deviation of the cover layer is determined from the thickness of the cover layer of the disc detected by the above-described detection means and the standard thickness of the cover layer of the optical disc of the Blu-ray disc standard (the thickness of the cover layer between the optical disc surface and the first reflection layer is 100 μm while the thickness of the cover layer between the first reflection layer and the second reflection layer is 25 μm). After that, spherical aberration is corrected by outputting a required drive signal to the beam expander which is a correction means for spherical aberration 120 on the basis of the determination of the thickness of the cover layer of the disc.

The LD drive circuit 400 also shown in FIG. 3 controls oscillation of the semiconductor laser oscillator 150 in the pickup 100 on the basis of the LD drive signal fed from the control circuit 300.

Additionally, the optical device of the present embodiment comprises an encoder/decoder (not shown) which conducts encoding (modulation) and decoding (demodulation) processes in cooperation with the above-described control circuit 300.

For example, when data is recorded (written) in the optical disc, the control circuit 300 encodes the data transferred from the external processor unit through the interface in accordance with the specification of the optical disc fed from the control circuit 300. In addition, the control circuit 300 controls the pickup 100 by transferring a signal to the LD drive circuit 400 to control oscillation of laser as well as writes the above encoded data in the reflection layer of the optical disc.

On the other hand, when reproducing the data from the optical disc, the control circuit 300 decodes the data on the basis of a data signal (RF signal) in reading the disc inputted from the computing circuit 200 in accordance with the specification of the optical disc fed from the control circuit 300. The decoded data is forwarded to the external processor unit through the interface. Circuits according to standards like AT Attachment Packet Interface (ATAPI), Small Computer System Interface (SCSI) and so on may be properly employed as the interface.

FIGS. 4 and 5 show a more detailed internal structure of the pickup 100, according to which will be described in more details the structure of the pickup 100. The pickup 100 of the present embodiment has basically the same structure as the one shown in FIG. 9 but a beam expander is provided anew as correction means for spherical aberration 120.

The pickup 100 comprises the semiconductor laser oscillator 150 which oscillates laser light, a 45-degree reflection mirror 156 which reflects laser light, the objective lens 2 which converges laser light to focus on the reflection layer 10 of the optical disc, and a polarizing beam splitter 151 which leads reflection light from the optical disc and the 45-degree reflection mirror 156 to the light receiving element 160, as shown in FIG. 4. A lens actuator (not shown) which may move the objective lens 2 slightly upward and downward is provided for focusing as an auxiliary unit. The objective lens 2 must have high quality to converge a beam to the diffraction limit, and its numerical aperture (NA) is set as high as about 0.85.

In addition, the beam expander with dual lens structure of a concave lens 154 and a convex lens 155 is provided as a correction means for spherical aberration between a collimator lens 153 and the objective lens 2.

In this embodiment, the semiconductor laser oscillator 150 used as the light source is a blue-violet laser diode which oscillates laser light with a wavelength of 405 nm. The collimator lens 153 is provided for shaping incident laser light so that collimated light is incident to the objective lens, and a condenser lens 157 and a cylindrical lens 158 are provided for condensing reflection light of laser light reflected from the reflection layer 10 of the loaded optical disc.

More specifically, predetermined polarized components out of linear polarized laser light generated from the semiconductor laser oscillator 150 are transmitted toward the disc through the polarizing beam splitter 151 in order to be circularly polarized light by a quarter wavelength plate 152. The concave lens 154 which is included in the beam expander turns laser light collimated by the collimator lens 153 into diffused light, and the convex lens 155 which is also included in the beam expander turns the diffused light into converging light. The laser light turned into converging light is reflected from the 45-degree reflection mirror 156 to be irradiated to the reflection layer 10 after being converged by the objective lens 2. The laser light reflected from the reflection layer 10 reaches the quarter wavelength plate 152 through the 45-degree reflection mirror 156 and the collimator lens 153 to become linearly polarized light which has different phase by 90 degree from the original polarizing direction. The polarizing beam splitter 151 only reflects polarized components different from the polarized components reflected as above so that reflected light is condensed by the condenser lens 157 and the cylindrical lens 158 to be incident to the light receiving element 160. The light receiving element 160 converts incident laser light into an electrical signal. The converted electrical signal is amplified and transmitted outside the pickup 100 to be demodulated in a well-known manner.

During focusing by the pickup 100, the distance between the disc surface and the objective lens is adjusted by driving the lens actuator to move the objective lens 2 upward and downward.

FIGS. 5A and 5B show the structure of the pickup 100 on the XY-plane and the XZ-plane, respectively.

Next, recording and reproducing action by the optical disc device of the present embodiment which is performed in parallel with correcting spherical aberration on the basis of the thickness of the cover layer determined as above will be described in detail as referring to FIGS. 6 and 7.

Figure 6:
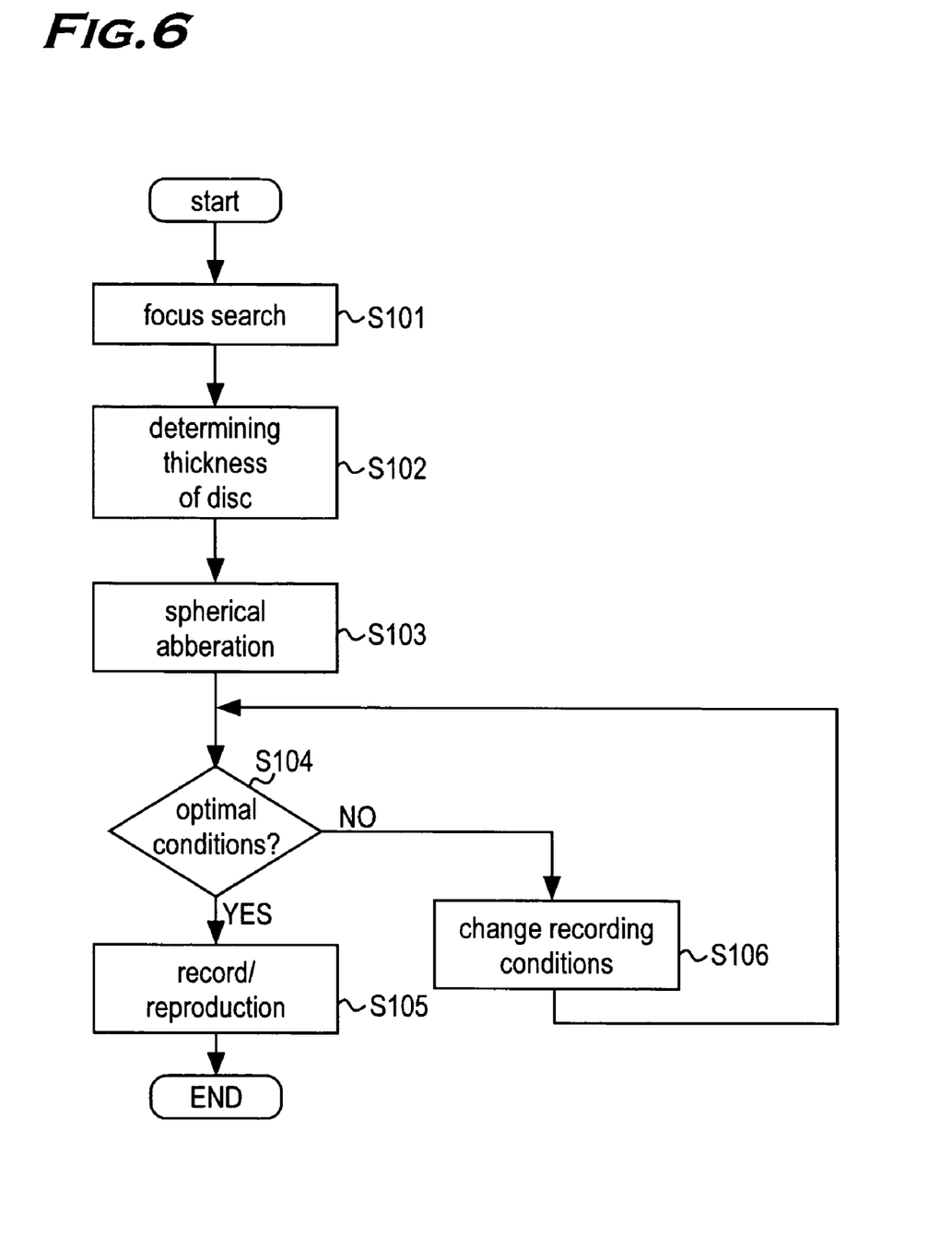
FIG. 6 is a flowchart illustrating process sequences by a control circuit of the optical disc device of the embodiment.

In the embodiment, the control circuit 300 (FIG. 3) corrects spherical aberration after determining the thickness of the disc by the focus search, the whole process of which is shown in FIG. 6.

Specifically, the focus search as illustrated in FIGS. 1A, 1B and 1C, and FIG. 2 always precedes recording and reproduction of the optical disc (step S101).

Next, in step S102, after the focus positions (focal points) on the disc surface, on the first reflection layer, and on the second reflection layer are recognized from the FE signal detected during the focus search, movement distance of the objective lens 2 is detected by detection means as described above. The thickness of the cover layer of the disc is determined from the detected movement distance of the objective lens 2. The thickness deviation of the cover layer is determined from the detected thickness of the cover layer of the disc and the standard thickness of the cover layer of the optical disc of the Blu-ray disc standard.

Next, in step S103, a lens (the convex lens 155 in this example) of the beam expander which is correction means for spherical aberration 120 is moved forward or backward appropriately by an actuator (not shown) on the basis of the thickness deviation of the cover layer determined in step S102.

Figure 7A:
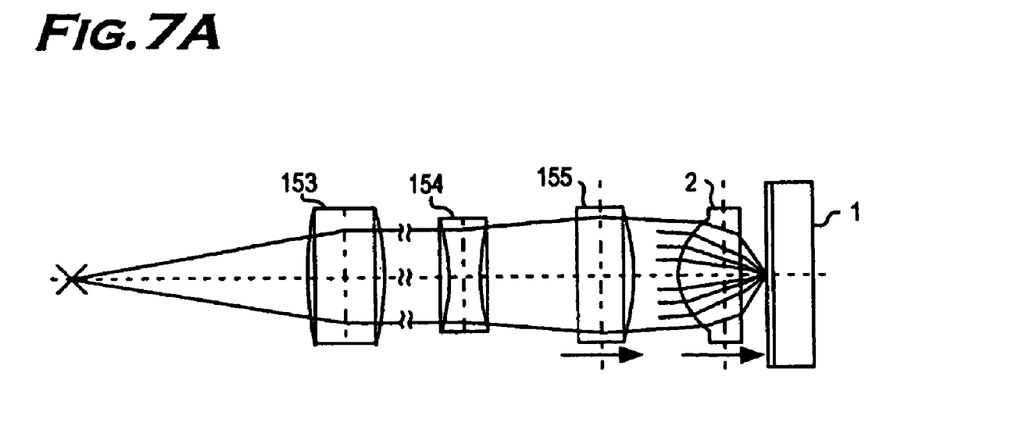
FIGS. 7A, 7B and 7C are schematic side views illustrating examples to correct spherical aberration by a beam expander.
Figure 7B:
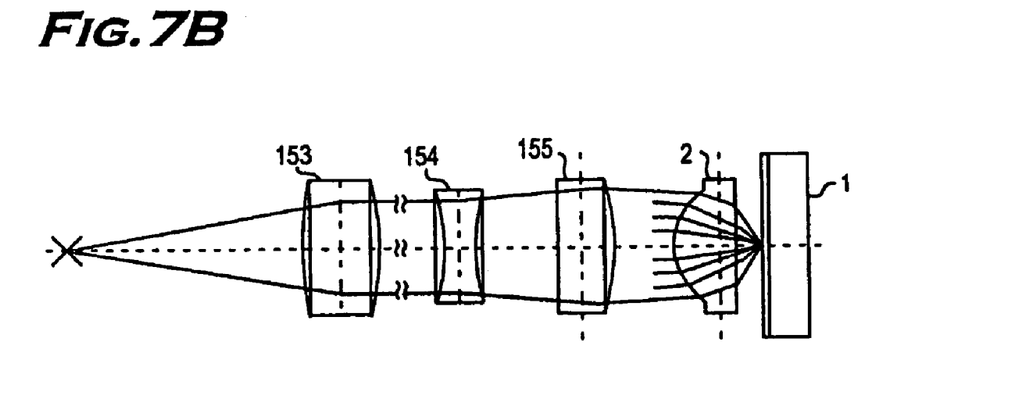
Figure 7C:
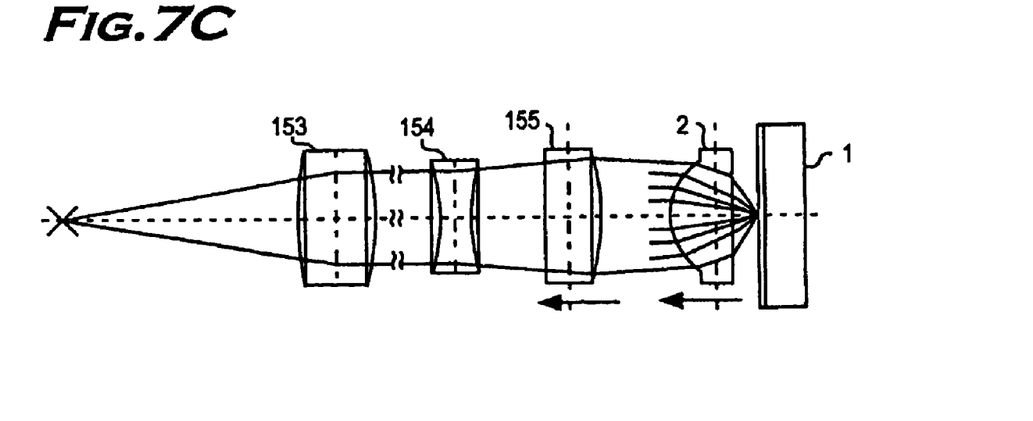

FIGS. 7A, 7B and 7C show examples of a process to correct spherical aberration through the beam expander on the basis of the determination of the thickness of the cover layer of the disc.

FIGS. 7A, 7B and 7C show examples for operating the beam expander with a dual lens structure of the concave lens 154 and the convex lens 155 provided as a correction means for spherical aberration 120 between the collimator lens 153 and the objective lens 2, as described in FIGS. 4 and 5. Laser light incident to the concave lens 154 is, as described in FIG. 4, circularly polarized collimated light.

When the thickness of the cover layer of the disc is determined to be thinner than the standard in step S102 for example, relative distance between the concave lens 154 and the convex lens 155 is increased so that light diffused by the concave lens 154 is further diffused to be incident to the convex lens 155, as shown in FIG. 7A. The incident light whose diameter is enlarged toward the outer circumference of the convex lens 155 is turned into converging light by a diffraction property of the convex lens 155, and the converging light is incident to the objective lens 2. The focal position of laser light incident to the objective lens 2 as converging light falls on a shallower position inside the disc than the usual position (focal position of light incident as collimated light) because of a diffraction property of the objective lens 2. The focal position may be made to fall on the reflection layer of the disc by moving the objective lens 2 nearer to the disc.

On the other hand, when the thickness of the cover layer of the disc is determined to be equal to the standard in step S102, the relative distance between the concave lens 154 and the convex lens 155 is maintained without any change, as shown in FIG. 7B. Light diffused by the concave lens 154 is turned into collimated light by diffraction properties of the convex lens 155, and the collimated light is incident to the objective lens 2. Therefore, the focal position may fall on the usual position.

When the thickness of the cover layer of the disc is determined to be thicker than the standard in step S102, relative distance between the concave lens 154 and the convex lens 155 is decreased so that light diffused by the concave lens 154 is further diffused by the convex lens 155 to be incident to the objective lens 2, as shown in FIG. 7C. The focal position of laser light incident to the objective lens 2 as diffused light falls on a deeper position inside the disc than the usual position (focal position of light incident as collimated light) because of the diffraction property of the objective lens 2. The focal position may be made to fall on the reflection layer of the disc by moving the objective lens 2 away from the disc.

If other conditions (for example, laser power of the semiconductor laser oscillator 150 (FIG. 3) and so on) necessary for recording and reproduction of the disc are optimal in step S104 (YES), recording and reproduction is made possible, so begins actual recording and reproduction (step S105).

On the other hand, if other conditions necessary for recording and reproduction of the disc are not optimal (NO in step S104), recording condition such as above-described laser power are changed (step S106) and whether the conditions are optimal or not is judged again (step S104). This process is repeated until the conditions are optimal. Actual recording and reproduction starts when the conditions become satisfactory (step S105).

As described hereinbefore in detail, the optical disc device according to this embodiment has excellent advantages cited hereinafter.

(1) An optical disc 1 of the Blu-ray disc standard has dual layer structure with a first reflection layer 11 and a second reflection layer 12 laminated at a predetermined interval on one side. At present, it is this optical disc of the Blu-ray disc standard that needs an objective lens with a high numerical aperture for its optical system (pickup). Therefore, the thickness deviation of the cover layer can not be ignored as a cause to generate spherical aberration. According to the above-described structure, the thickness of the cover layer from the optical disc surface 13 to the first reflection layer 11 and the thickness of the cover layer from optical disc surface 13 to the second reflection layer 12 may be accurately detected in the optical disc of dual layer structure on one side. In other words, the cause of spherical aberration (the thickness deviation of the cover layer of the disc) may be accurately detected without providing any special means to detect spherical aberration.

(2) Usually, drive voltage for the actuator used for the above-described focus search is fairly stable. The movement speed of the objective lens 2 when relative distance between the optical disc 1 and the objective lens 2 is linearly changed is almost directly proportional to this voltage. The movement speed of the objective lens is detected by tabulating the relation between the drive voltage for the actuator and the movement speed of the objective lens, so that the thickness of the cover layer can be easily and quite accurately detected.

(3) Spherical aberration caused by the thickness deviation of the cover layer of the optical disc 1 is automatically corrected by a beam expander for example. Such an additional function is particularly beneficial for the optical disc device which reads out data from and writes data to an optical disc of the Blu-ray disc standard.

(4) The above-described beam expander is generally adopted in an optical system (pickup) of such an optical disc device. Therefore, spherical aberration can be automatically corrected without increasing the number of parts by the above-described structure using such a beam expander as correction means.

The optical disc device according to the present invention is not limited to the above-described embodiment. The embodiment may be properly modified as described hereinbelow.

Figure 8:
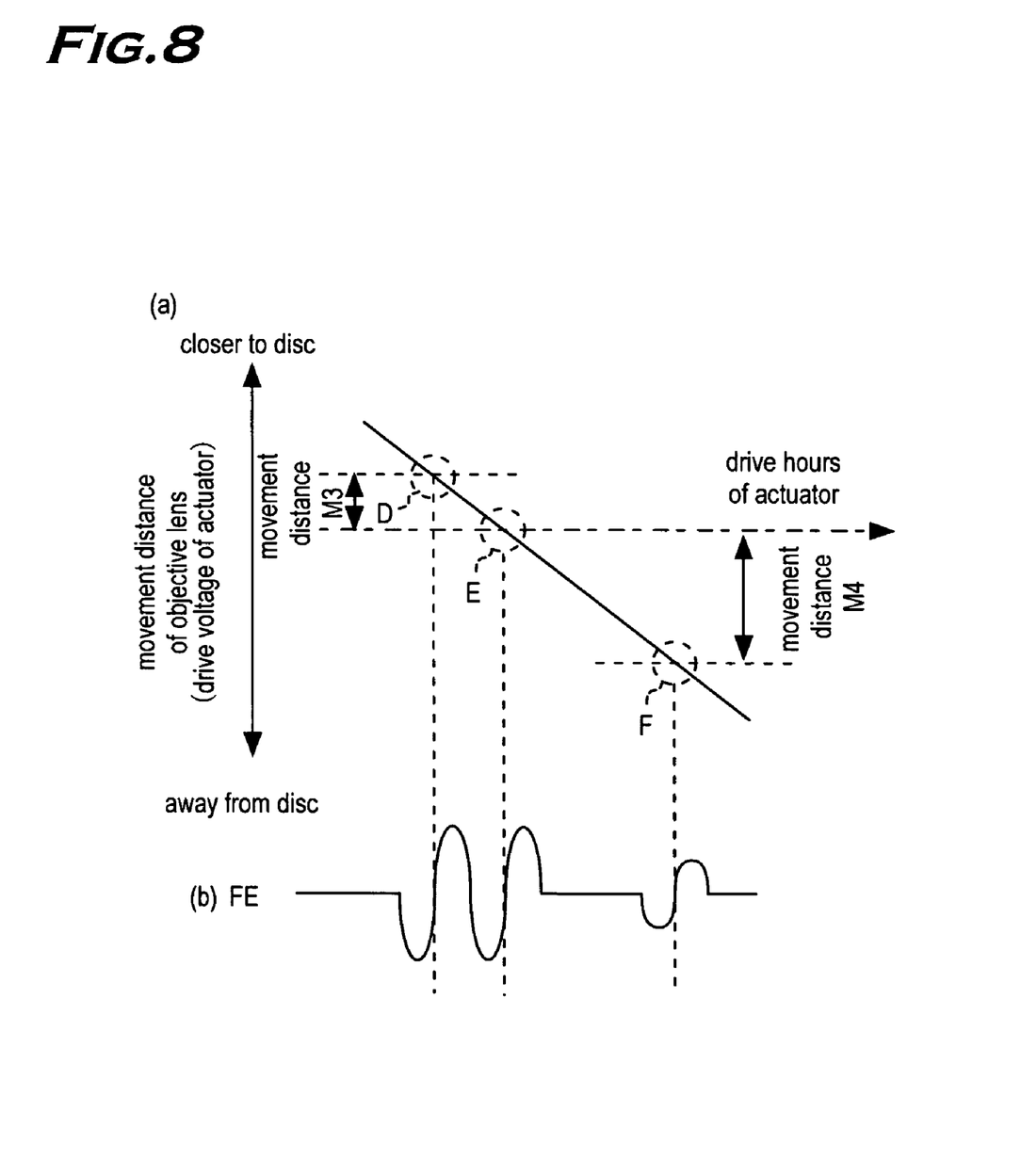

Although in the above-described embodiment, the focus search is conducted by moving the objective lens from a position away from the disc to a position nearer to the disc, the focus search may also be conducted by reversely moving the objective lens 2 from a position nearer to the disc to a position away from the disc as shown in FIG. 8. In FIG. 8(a), the point D corresponds to FIG. 1C where the focal position falls on the second reflection layer 12, the point E corresponds to FIG. 1B where the focal position falls on the first reflection layer 11, and the point F corresponds to FIG. 1A where the focal position falls on the disc surface 13. Every time the focal position falls on each of these points, an FE signal in opposite phase to the FE signal shown in FIG. 2(b) appears as shown in FIG. 8(b). Therefore, the thickness of the cover layer from the first reflection layer 11 to the second reflection layer 12 can be determined corresponding to movement distance of the objective lens 2 [M3], and the thickness of the cover layer from the disc surface 13 to the first reflection layer 11 can be determined corresponding to movement distance of the objective lens 2 [M4] even when the focus search is conducted in such a manner. Also in this case, M3+M4 represents the thickness of the cover layer from the disc surface 13 to the second reflection layer 12 including the first reflection layer 11.

Although in the above-described embodiment, the beam expander has dual lens structure with the concave lens 154 and the convex lens 155, the structure of the beam expander is not limited to this. For example, the beam expander may consist of two convex lenses, or more than three lenses. In other words, physical structure of the beam expander is optional.

Although in the above-described embodiment, the beam expander is used as correction means for spherical aberration, correction means for spherical aberration is not limited to the beam expander. The point is to variably control incident light to the objective lens to be collimated light/converging light/diffused light in accordance with the thickness of the cover layer, and the physical structure of correction means for spherical aberration is optional. Additionally, although in the above-described embodiment, correction means for spherical aberration is disposed between the collimator lens 153 and the objective lens 2, the layout is optional so long as incident light to the objective lens may be variably controlled to be collimated light/converging light/diffused light in accordance with the thickness of the cover layer.

Although in the above-described embodiment, the movement speed of the objective lens is detected by tabulating the relation between the movement speed of the objective lens and the drive voltage of the actuator, the movement speed of the objective lens may be detected otherwise. For example, the movement speed of the objective lens may be determined by maintaining the movement speed of the objective lens at a constant level.

Although in the above-described embodiment, the optical disc is an optical disc of the Blu-ray disc standard which has dual layer structure with a first reflection layer 11 and a second reflection layer 12 laminated at a predetermined interval on one side, the intended optical disc is optional. In other words, the present invention may be applicable to optical discs of the CD, DVD or AOD standards regardless of single or dual layer structure.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

I claim:

1. An optical disc device which performs either or both of data recording to or data reproduction from a reflection layer of an optical disc on which data is recorded and which is covered with a light-transmitting cover layer, comprising:
    an objective lens for condensing laser light emitted from a laser light source onto the reflection layer through the light-transmitting cover layer;
    a light receiving element for receiving reflection light from the reflection layer of the optical disc in order to convert the reflection light to an electrical signal; and
    detection means for detecting a thickness of the cover layer on the basis of a time difference between a focus error signal corresponding to a surface of the optical disc and a focus error signal corresponding to the reflection layer, both of which are obtained through the light receiving element when a relative distance between the objective lens and the optical disc is linearly changed in a focus search of the optical disc,
    wherein the detection means includes means for judging a movement speed of the objective lens on the basis of a drive voltage for an actuator which linearly changes the relative distance between the objective lens and the optical disc, and the thickness of the cover layer is calculated by multiplying the time difference by the judged movement speed of the objective lens.

2. The optical disc device according to claim 1, wherein the optical disc has a dual layer structure with a first reflection layer and a second reflection layer laminated at a predetermined interval on one side, and the detection mans detects, respectively, a thickness of the cover layer from the surface of the optical disc to the first reflection layer and a thickness of the cover layer from the surface of the optical disc to the second reflection layer on the basis of time differences among the focus error signal corresponding to the surface of the optical disc, a focus error signal corresponding to the first reflection layer, and a focus error signal corresponding to the second reflection layer, all of which are obtained through the light receiving element when the relative distance between the objective lens and the optical disc is linearly changed in the focus search of the optical disc,
    wherein the detection means includes means for judging a movement speed of the objective lens on the basis of a drive voltage of an actuator which linearly changes the relative distance between the objective lens and the optical disc, and the thickness of the cover layer is calculated by multiplying the time differences by the judged movement speed of the objective lens.

3. The optical disc device according to claim 1, further comprising correction means to correct a way the objective lens condenses light in accordance with the thickness of the cover layer detected by the detection means.

4. The optical disc device according to claim 3, wherein the correction means is a beam expander which changes a diameter of laser light incident to the objective lens by combining at least two lenses.

5. The optical disc according to claim 3, further comprising means to determine a thickness deviation of the cover layer from the thickness of the cover layer of the disc detected by the detection means and a standard thickness of the cover layer of the optical disc,
    wherein the correction if performed by driving the correction means on the basis of the determination of the thickness of the cover layer.

6. The optical disc according to claim 5, wherein spherical aberration is corrected by driving the correction means on the basis of the determination of the thickness of the cover layer.

* * * * *